Dec. 5, 1950 C. E. GIFFORD 2,532,806
DEVICE FOR PIVOTALLY CONNECTING THE FRAME OF
A ROAD ROLLER WITH A SUPPORTING ROLL
Filed April 17, 1947 2 Sheets-Sheet 1
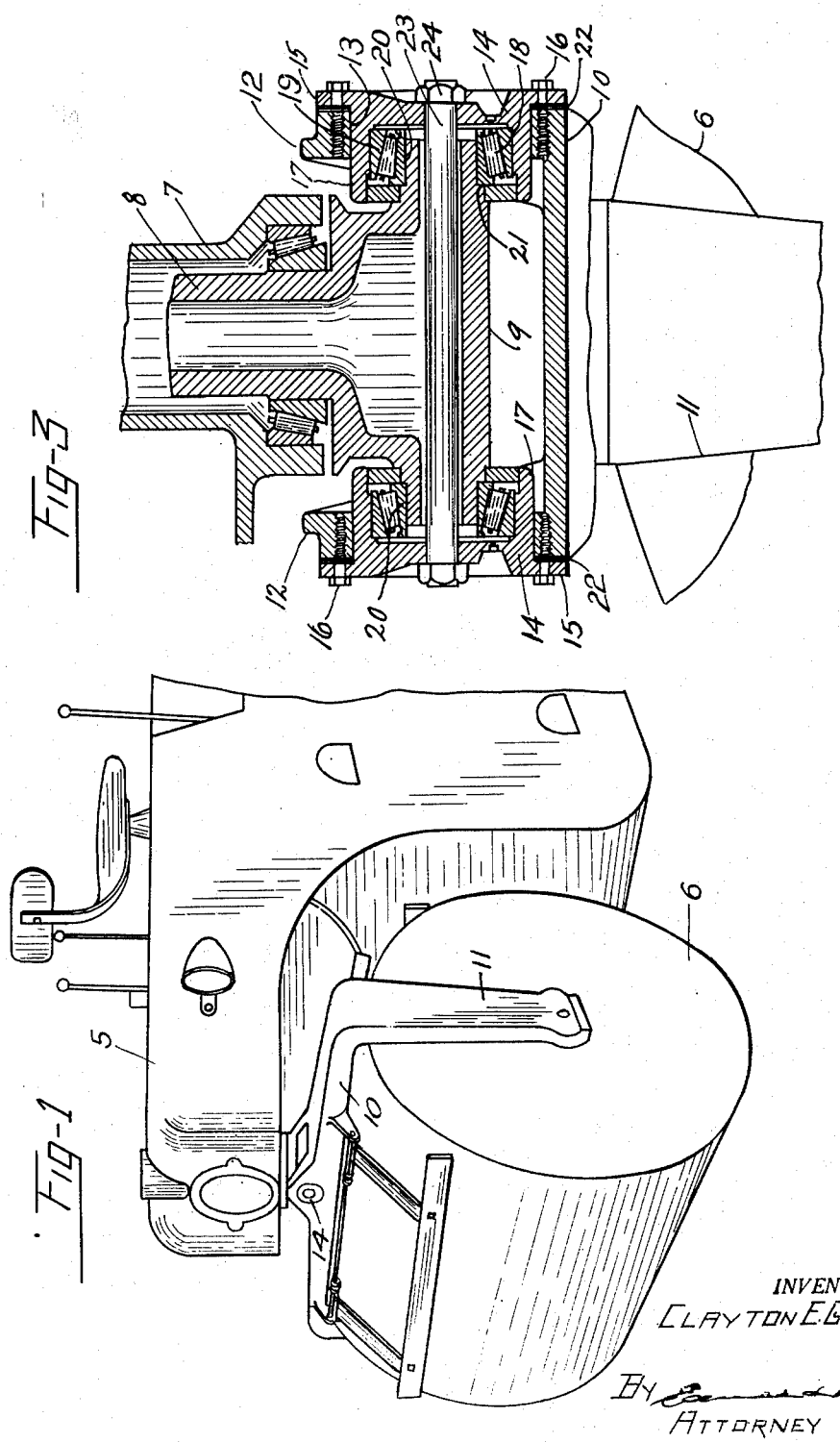
INVENTOR.
CLAYTON E. GIFFORD
BY
ATTORNEY Dec. 5, 1950 — C. E. GIFFORD — 2,532,806
DEVICE FOR PIVOTALLY CONNECTING THE FRAME OF
A ROAD ROLLER WITH A SUPPORTING ROLL
Filed April 17, 1947 — 2 Sheets-Sheet 2
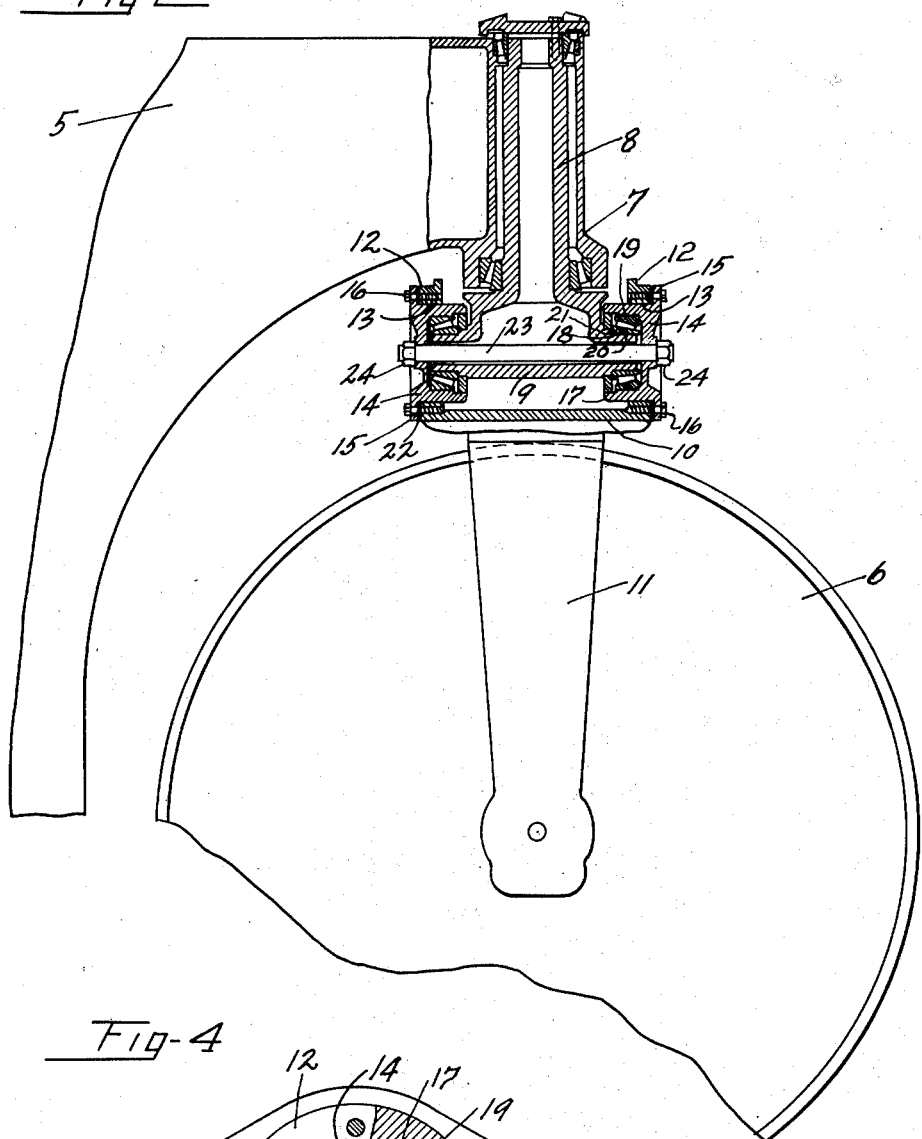
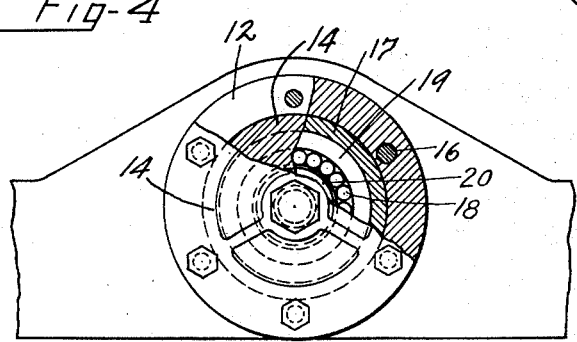
INVENTOR.
CLAYTON E GIFFORD
ATTORNEY Patented Dec. 5, 1950

2,532,806

UNITED STATES PATENT OFFICE 2,532,806

DEVICE FOR PIVOTALLY CONNECTING THE FRAME OF A ROAD ROLLER WITH A SUPPORTING ROLL

Clayton E. Gifford, Marion, Ohio, assignor to The Huber Manufacturing Company, Marion, Ohio, a corporation of Ohio Application April 17, 1947, Serial No. 742,000

12 Claims. (Cl. 280—109)

This invention relates to a device for pivotally connecting the frame of a road roller with a supporting roll. It is customary to mount the steering roll of a road roller for movement about a vertical axis with relation to the frame and for tilting movement about a fore and aft axis. Heretofore the fore and aft pivot pin has been mounted either in plain bushings or on straight roller bearings. The heavy load and frequent shock on the pivot pin subject the pin and its bearings to severe wear and no means are provided for taking up that wear. As a result the pivot pin or its bearings or both, when badly worn, must be replaced. Further, unless the several parts are manufactured to close tolerances there is apt to be an initial looseness in the pivotal connection which cannot be eliminated.

One object of the invention is to provide a pivotal connection of this general type which will be subject to less wear than the usual connection and which may be adjusted to take up any looseness which may exist, due to wear or otherwise.

A further object of the invention is to provide a pivot pin mounting of a strong durable construction and which can be manufactured and assembled at relatively low cost.

A further object of the invention is to provide such a mounting in which the roll yoke will be strongly reinforced against springing under heavy load.

Other objects of the invention may appear as the device is described in detail.

In the accompanying drawings Figure 1 is a side elevation of a road roller equipped with my invention; Figure 2 is a side elevation of the front end portion of the frame and its supporting roller, showing the connecting mechanism in section; Figure 3 is an enlarged sectional view of the pivot pin and its mounting; and Figure 4 is a front end elevation of the pivot pin mounting, partly broken away.

In these drawings I have illustrated a preferred embodiment of the invention, but it is to be understood that the device as a whole as well as the several parts thereof, may take various forms without departing from the spirit of the invention.

The roll yoke is supported on the roll and is connected with the frame by an upright spindle or king pin, both the yoke and the spindle are of a known construction. Rigidly connected with the lower end of the spindle and extending transversely thereto is a member which constitutes a pivot pin. The ends of this pivot pin are mounted respectively in bearings carried by bearing supporting members or carriers rigidly mounted on the respective sides of the yoke, these carriers being adjustable lengthwise of the pivot pin to adjust the bearings and to take up any looseness in the pivotal connection.

In the particular construction here shown the end portion 5 of the frame overhangs the roll 6 and is provided with a vertical bearing 7 in which is mounted the spindle or king pin 8. Rigidly secured to the lower end of the spindle, and in the present instance formed integral therewith, is a transverse member 9 which constitutes the fore and aft pivot pin. The yoke which supports the forward end of the frame on the roll 6 comprises a transverse member 10 which extends lengthwise of the roll, and downwardly extending arms 11 which are connected with and supported on the roll at the axis thereof. The transverse member 10 of the yoke is provided at its front and rear sides with upwardly extending members 12 which are preferably, but not necessarily, formed integral therewith. Each of these members is provided with a relatively large opening 13 in which is mounted a bearing supporting member or carrier 14. Each carrier is provided with a circumferential, radial flange 15 which overlaps the outer surface of the adjacent upright member 12 and is rigidly secured thereto by suitable attaching devices, such as screws 16. Each carrier 14 is also provided with an inwardly extending annular flange 17 which extends about the adjacent end of the pivot pin 9 and is spaced radially therefrom. Interposed between this annular flange and the end of the pivot pin is an anti-friction device whereby the pivot pin is rotatably supported on the carrier. This anti-friction device may be of any suitable character but preferably comprises a taper roller bearing 18, the outer race 19 of which bears against the annular flange 17 and against the upright portion of the carrier 14, and the inner race 20 of which is mounted on the end of the spindle and bears against a shoulder 21 on the spindle. Each carrier 14 is adjustable lengthwise of the spindle and the inward movement of the carrier will adjust the bearing to take up any looseness therein, thus maintaining the bearing elements in snug bearing contact one with the other. This adjustment of the carriers may be effected in any suitable manner and in the present instance shims 22 are interposed between the radial flange 15 of each carrier and the outer surface of the corresponding upright member 12 of the yoke. Thus by removing one or more of the shims and tightening the screws the carrier may be moved lengthwise of the pivot pin to adjust the bearing.

For the purpose of reinforcing the yoke and the upright parts thereof against distortion under heavy load, the pivot pin 9 is tubular in form and a tie bar, such as a bolt 23, extends through the tubular pivot pin and through the bearing carrier 14 and includes means, such as nuts 24, for rigidly connecting the same with said carriers in such a manner as to prevent any outward movement of the carriers with relation one to the other and to thereby prevent any springing or distortion of the upright members 12 of the yoke, due to heavy stresses or otherwise.

It will be apparent, therefore, that the spindle 8, and therefore the end portion of the frame, is supported on the fore and aft pivot pin which rotates with the spindle about the vertical axis of the latter and which permits the tilting movement of the roll about a fore and aft axis. The construction is such that the bearing surfaces are subject to relatively small wear and such wear as occurs may be easily compensated for by the axial adjustment of the bearing carriers. The device as a whole is of simple construction and can be manufactured and assembled at relatively low cost.

While I have shown and described one embodiment of my invention, I wish it to be understood that I do not desire to be limited to the details thereof, as various modifications may occur to a person skilled in the art.

Having now fully described my invention what I claim as new and desire to secure by Letters Patent is:

1. In a road roller, a frame, a roll yoke, a roll in said yoke, a vertical spindle rotatably mounted in said frame, a pivot pin extending transversely to and having supporting connection with said spindle, bearings carried by said yoke and having supporting connection with respective ends of said pivot pin, and means for adjusting said bearings to take up wear.

2. In a road roller, a frame, an upright bearing carried by said frame, a spindle mounted in said bearing, a pivot pin extending transversely to and having supporting connection with the lower end portion of said spindle, a roll yoke, carriers mounted on said yoke and having parts in opposed relation to the respective ends of said pivot pin, anti-friction devices supported between the respective ends of said pivot pin and the opposed parts of said carriers, means for adjusting said carriers lengthwise of said pivot pin with relation to said yoke, and a roll having supporting connection with said yoke.

3. In a road roller, a frame, an upright bearing carried by said frame, a spindle mounted in said bearing, a pivot pin extending transversely to and rigid with the lower end portion of said spindle, a roll yoke, carriers mounted on said yoke and having parts in opposed relation to the respective ends of said pivot pin, taper roller bearings supported between the respective ends of said pivot pin and the opposed parts of said carriers, means for adjusting said carriers lengthwise of said pivot pin with relation to said yoke to take up looseness in said bearing, and a roll having supporting connection with said yoke.

4. In a road roller, a frame, an upright bearing carried by said frame, a spindle mounted in said bearing, a pivot pin extending transversely to and rigid with the lower portion of said spindle, a roll yoke having at its respective sides upright members provided with alined openings, carriers mounted in the openings in said upright members and having parts extending about the respective ends of said pivot pin, anti-friction devices interposed between said ends of said pivot pin and said carriers, and a roll having supporting connection with said yoke.

5. In a road roller, a frame, an upright bearing carried by said frame, a spindle mounted in said bearing, a pivot pin extending transversely to and rigid with the lower portion of said spindle, a roll yoke having at its respective sides upright members provided with alined openings, carriers mounted in the openings in said upright members and having parts extending about the respective ends of said pivot pin, anti-friction devices interposed between said ends of said pivot pin and said carriers, means for adjusting said carriers axially with relation to said upright members, and a roll having supporting connection with said yoke.

6. In a road roller, a frame, an upright bearing carried by said frame, a spindle mounted in said bearing, a tubular pivot pin extending transversely to and rigid with the lower portion of said spindle, a roll yoke, carriers mounted on said yoke and having parts in opposed relation to the respective ends of said pivot pin, anti-friction devices supported between the respective ends of said pivot pin and the opposed parts of said carriers, means for adjusting said carriers lengthwise of said pivot pin with relation to said yoke, a bolt extending through said tubular pivot pin and through said carriers to prevent the latter from yielding under heavy stresses, and a roll in said yoke.

7. In a road roller, a roll, a frame having a part overhanging said roll and provided with an upright bearing, a yoke embracing said roll and supported thereon at the axis thereof, said yoke having front and rear upright parts rigid therewith, each of said parts having an opening therethrough, bearing supporting members mounted in respective upright parts and each having an inwardly extending annular flange, means for securing said supporting members to the respective upright parts in adjusted positions with relation thereto, a pivot pin having end portions extending into the respective annular flanges, bearings arranged between the end portions of said pivot pin and the adjacent flanges, and a spindle rigidly connected with said pivot pin and mounted in the bearing in said frame.

8. In a road roller, a roll, a frame having a part overhanging said roll and provided with an upright bearing, a yoke embracing said roll and supported thereon at the axis thereof, said yoke having front and rear upright parts rigid therewith, each of said parts having an opening therethrough, bearing supporting members mounted in the respective upright parts, each supporting member having an annular inwardly extending flange and a radial flange, shims between said radial flanges and the respective upright parts, attaching devices to rigidly secure each radial flange to the adjacent upright part, a pivot pin having end portions extending into the respective annular flanges, bearings arranged between the end portions of said pivot pin and the adjacent flanges, and a spindle rigidly connected with said pin and mounted on the bearing on said frame.

9. In a road roller, a roll, a frame having a part overhanging said roll and provided with an upright bearing, a yoke embracing said roll and supported thereon at the axis thereof, said yoke having front and rear upright parts rigid therewith, each of said parts having an opening therethrough, bearing supporting members mounted in the respective upright parts, each supporting member having an annular inwardly extending flange and a radial flange, shims between said radial flanges and the respective upright parts, attaching devices to rigidly secure each radial flange to the adjacent upright part, a tubular pivot pin having end portions extending into the respective annular flanges, antifriction devices interposed between each annular flange on the adjacent end of said pivot pin, a tie bar extending through said pivot pin and secured to said bearing supporting members, and a spindle rigidly connected with said pivot pin and mounted in the bearing in said frame.

10. A device for supporting the frame of a road roller on a roll, comprising a yoke having means whereby it may be supported on said roll at the axis of the latter and including a transverse member, front and rear bearing supporting members separate from and detachably mounted on said transverse member of said yoke, alined bearings supported on said supporting members, a pivot member having end portions mounted in the respective bearings, and a spindle rigid with said pivot member and adapted to be rotatably connected with said frame.

11. A device for supporting the frame of a road roller on a roll, comprising a yoke having means whereby it may be supported on said roll at the axis of the latter and including a transverse member, front and rear bearing supporting members mounted on said transverse member of said yoke, alined bearings supported on said supporting members, a pivot member having end portions mounted in the respective bearings, means for adjusting said supporting members lengthwise of said pivot member, and a spindle rigid with said pivot member and adapted to be rotatably connected with said frame.

12. A device for supporting the frame of a road roller on a roll, comprising a yoke having means whereby it may be supported on said roll at the axis of the latter and including a transverse member, upright members rigid with the front and rear portions of the transverse member of said yoke and having openings therethrough, bearing carriers mounted in said upright members and adjustable toward and from each other, a pivot pin, bearings interposed between the ends of said pivot pin and the respective bearing carriers, and an upright spindle rigidly connected with said pivot pin and adapted to be rotatably mounted in said frame.

CLAYTON E. GIFFORD.

REFERENCES CITED

The following references are of record in the file of this patent:

UNITED STATES PATENTS

| Number | Name | Date |
| --- | --- | --- |
| 229,994 | Fowler | July 13, 1880 |
| 1,376,286 | Lingard | Apr. 26, 1921 |
| 1,578,644 | Collins | Mar. 30, 1926 |
| 1,878,139 | Hertner | Sept. 20, 1932 |